(12) United States Patent
Lai et al.

(10) Patent No.: US 6,546,137 B1
(45) Date of Patent: Apr. 8, 2003

(54) FLASH SYSTEM FOR FAST AND ACCURATE PATTERN LOCALIZATION

(75) Inventors: Shang-Hong Lai, Plainsboro, NJ (US); Ming Fang, Cranbury, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 0 days.

(21) Appl. No.: 09/236,725

(22) Filed: Jan. 25, 1999

(51) Int. Cl.[7] .................................................. G06K 9/64
(52) U.S. Cl. ...................................... 382/217; 382/156
(58) Field of Search ................................. 382/217, 226, 382/147, 209, 141, 157, 259, 220, 107, 195, 294, 129, 105, 216, 243, 278; 340/934, 935, 937; 700/83, 85

(56) References Cited

U.S. PATENT DOCUMENTS 5,048,100 A * 9/1991 Kuperstein .................. 382/217
5,757,287 A * 5/1998 Kitamura et al. ............ 340/937
6,026,189 A * 2/2000 Greenspan .................. 382/226
6,175,644 B1 * 1/2001 Scola et al. .................. 381/141

* cited by examiner

Primary Examiner—Bhavesh M. Mehta
Assistant Examiner—Seyed Azarian
(74) Attorney, Agent, or Firm—Donald B. Paschburg

(57) ABSTRACT

A fast localization with advanced search hierarchy system for fast and accurate object localization in a large search space is based on an assumption that surrounding regions of a pattern within a search range are always fixed. The FLASH system comprises a hierarchical nearest-neighbor search system and an optical-flow based energy minimization system. The hierarchical nearest-neighbor search system produces rough estimates of the transformation parameters for the optical-flow based energy minimization system which provides very accurate estimation results and associated confidence measures.

17 Claims, 7 Drawing Sheets

OBJECT POSE OF THE BEST MATCH

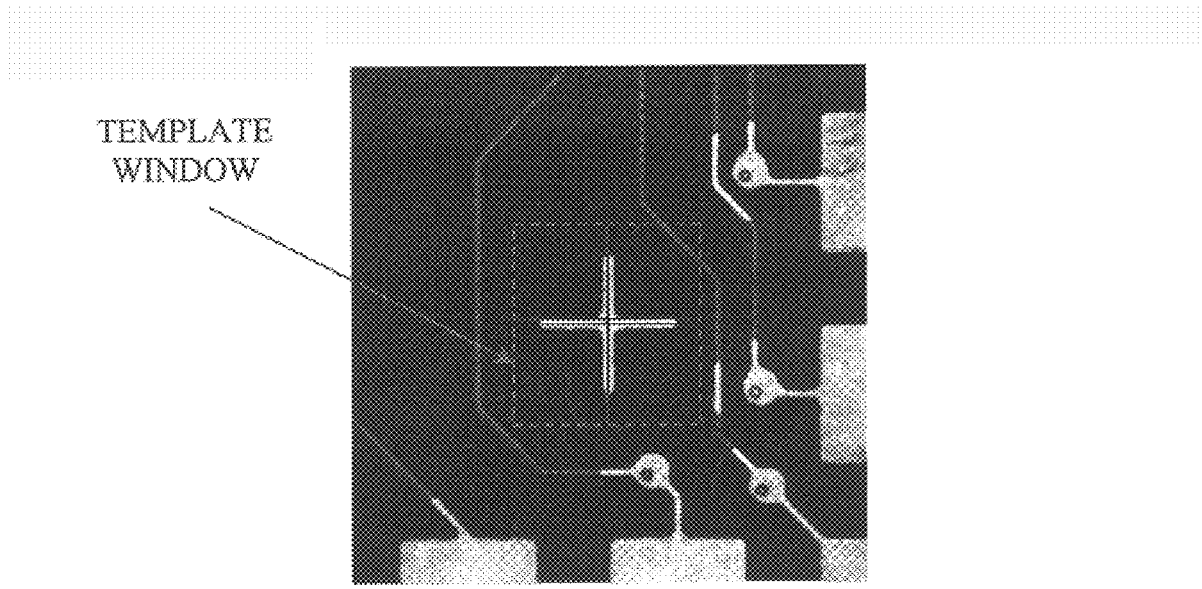
FIGURE 7(a)
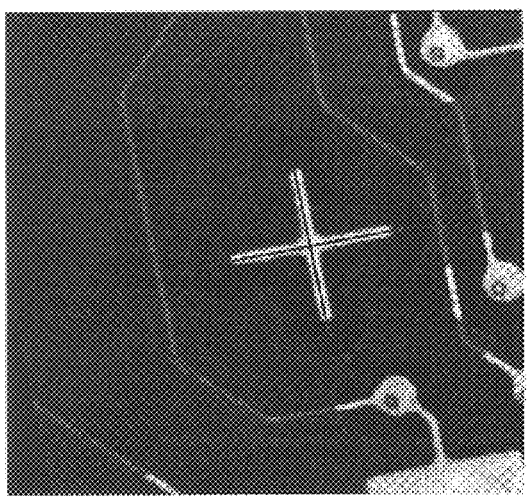 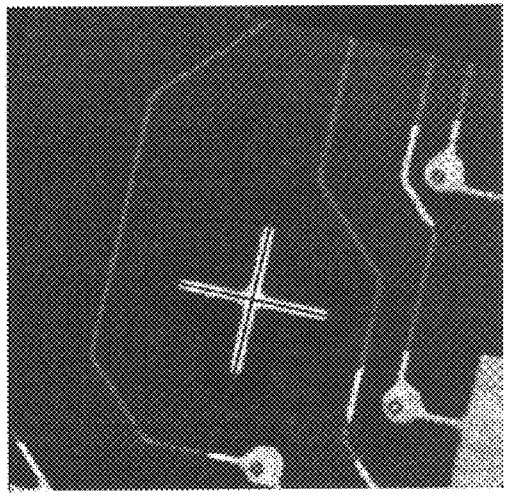
FIGURE 7(b)  FIGURE 7(c)

FLASH SYSTEM FOR FAST AND ACCURATE PATTERN LOCALIZATION

BACKGROUND OF THE INVENTION

1. Field of the Invention

The present invention relates to improving images and more particularly to object localization with an advanced search hierarchy.

2. Description of the Prior Art

The needs for accurate and efficient object localization prevail in many industrial applications, such as automated visual inspection and factory automation. The efficiency of the object localization system is directly related to the throughput of the product. In addition, the machine vision system should also be general enough to perform different kinds of tasks in a very short period of task switching time. This can significantly increase the applicability as well as the productivity of the system, which is very important for adapting to the fast changing needs of customers and markets.

The image reference approach is very popular in automatic visual inspection due to its general applicability to a variety of inspection tasks. This is further described by R. T. Chin in "Automatic Visual Inspection: 1981 to 1987", Computer Vision, Graphics, and Image Processing, Vol. 41, No. 3, pp. 346–381, 1988. However, it requires very precise alignment of the inspection pattern in the image. To achieve very precise pattern alignment, traditional template matching is extremely time-consuming when the search space is large. Some methods have been proposed to resolve this alignment problem. These are described by T. S. Newman and A. K. Jain in "A Survey Of Automatic Visual Inspection", Computer Vision and Image Understanding, Vol. 61, No. 2, pp. 231–262, 1995; by A. A. Rodriguez and J. R. Mandeville in "Image Registration For Automated Inspection Of Printed Circuit Patterns Using CAD Reference Data", Machine Vision and Applications, Vol. 6, pp. 233–242, 1993; and by T. Hiroi, S. Maeda, H. Kubota, K. Watanabe and Y. Nakagawa in "Precise Visual Inspection For LSI Wafer Patterns Using Subpixel Image Alignment", Proc. Second IEEE Workshop on Applications of Computer Vision, pp. 26–34, Florida, December 1994. Rodriguez and Mandeville proposed an image registration technique by fitting feature points in the zero-crossings extracted from the inspection image to the corresponding points extracted from the CAD model via an affine transformation. However, the correspondence between the two set of feature usually can not be reliably established. Hiroi et al. presented a sum-of-squared-differences (SSD) based method to determine the shift between the two images. Unfortunately, this method is restricted to recover small shifts.

SUBJECT OF THE INVENTION

The present invention provides a new FLASH (Fast Localization with Advanced Search Hierarchy) system for fast and accurate object localization in a large search space. This object localization system is very useful for applications in automated visual inspection and pick-and-place systems for automatic factory assembly. This system is based on the assumption that the surrounding regions of the pattern within the search range are always fixed. The FLASH system comprises a hierarchical nearest-neighbor search system and an optical-flow based energy minimization system. The hierarchical nearest-neighbor search system produces rough estimates of the transformation parameters for the optical-flow based energy minimization system which provides very accurate estimation results and associated confidence measures.

BRIEF DESCRIPTION OF THE DRAWINGS

FIG. 7 illustrates in FIG. 7(a) a second reference image and a template window used for experiments on pattern localization under a large search space and in FIG. 7(b) and FIG. 7(c), two input images with located reference points using the FLASH system of the present invention.

DETAILED DESCRIPTION OF THE INVENTION

The needs for accurate and efficient object localization prevail in many industrial applications, such as automated visual inspection and factory automation. Traditional template matching techniques are unsatisfactory due to the enormous amounts of computation involved to achieve very accurate localization, especially when the search space is very large. The present invention provides a new FLASH (Fast Localization with Advanced Search Hierarchy) system for fast and accurate object localization in a large search space. This system is based on the assumption that the surrounding regions of the pattern within the search range are always fixed. The FLASH system comprises a hierarchical nearest-neighbor search system and an optical-flow based energy minimization system. The hierarchical nearest-neighbor search system produces rough estimates of the transformation parameters for the optical-flow based energy minimization system, which provides very accurate estimation results and associated confidence measures. The hierarchical nearest-neighbor search system first computes selected wavelet features from the image inside the template window as the input feature vector. In the training phase, the same feature extraction process is applied to the transformed reference image for a discrete set of transformation parameters sampled from the search space, and then these feature vectors are clustered using hierarchical competitive networks. In the online execution phase, a rough estimate of the transformation parameters can be obtained using the hierarchical nearest-neighbor search system for the feature vector computed from the input image. The optical-flow based energy minimization system is subsequently applied to provide a very accurate estimate with a good initial guess supplied by the hierarchical nearest-neighbor search system. This is further described in U.S. patent application Ser. No. 08/993,850 entitled "A Method For Localization Refinement Of Pattern Images" filed on Dec. 18, 1997, assigned to the same assignee as the present invention and hereby incorporated by reference. Experimental results are given to demonstrate the efficiency of the system.

Figure 1:
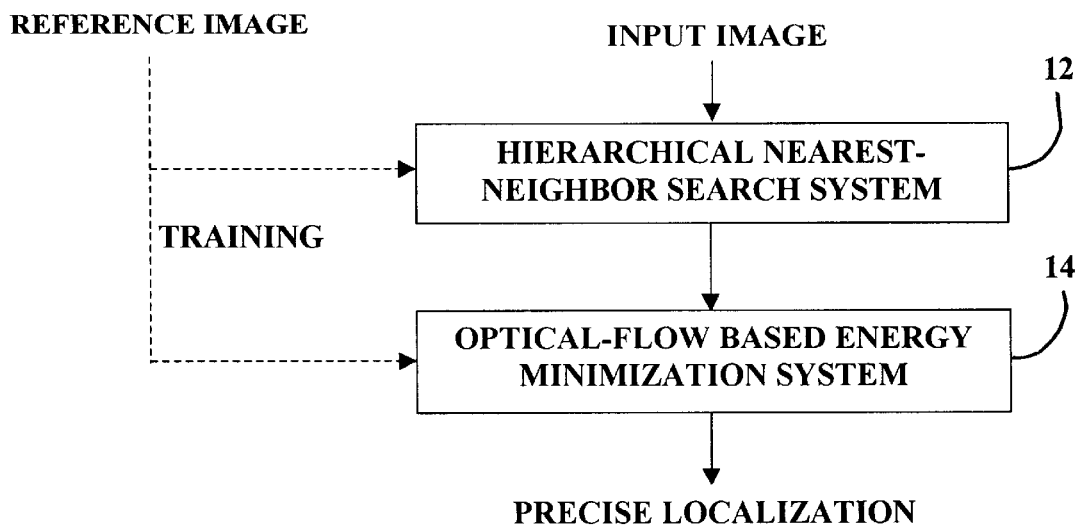
FIG. 1 illustrates a block diagram of the present invention.

A flow diagram of the FLASH system of the present invention is shown in FIG. 1. The FLASH system comprises a hierarchical nearest-neighbor search system 12 and an optical-flow based energy minimization system 14. Hierarchical nearest-neighbor search system 12 produces rough estimates of the transformation parameters for the optical-flow based energy minimization system, which provides very accurate estimation results and associated confidence measures. Hierarchical nearest-neighbor search system 12 first computes selected wavelet features from the image inside the template window as the input feature vector. Then, a rough estimate of the transformation parameters that correspond to the best match of the feature vector computed from the input image and those of the transformed reference image are obtained via hierarchical nearest-neighbor search system 12. Optical-flow based energy minimization system 14 is subsequently applied to provide an accurate estimate with a good initial guess supplied by hierarchical nearest-neighbor search system 12. The details of hierarchical nearest-neighbor search system 12 and optical-flow based energy minimization system 14 are described below.

Figure 2:
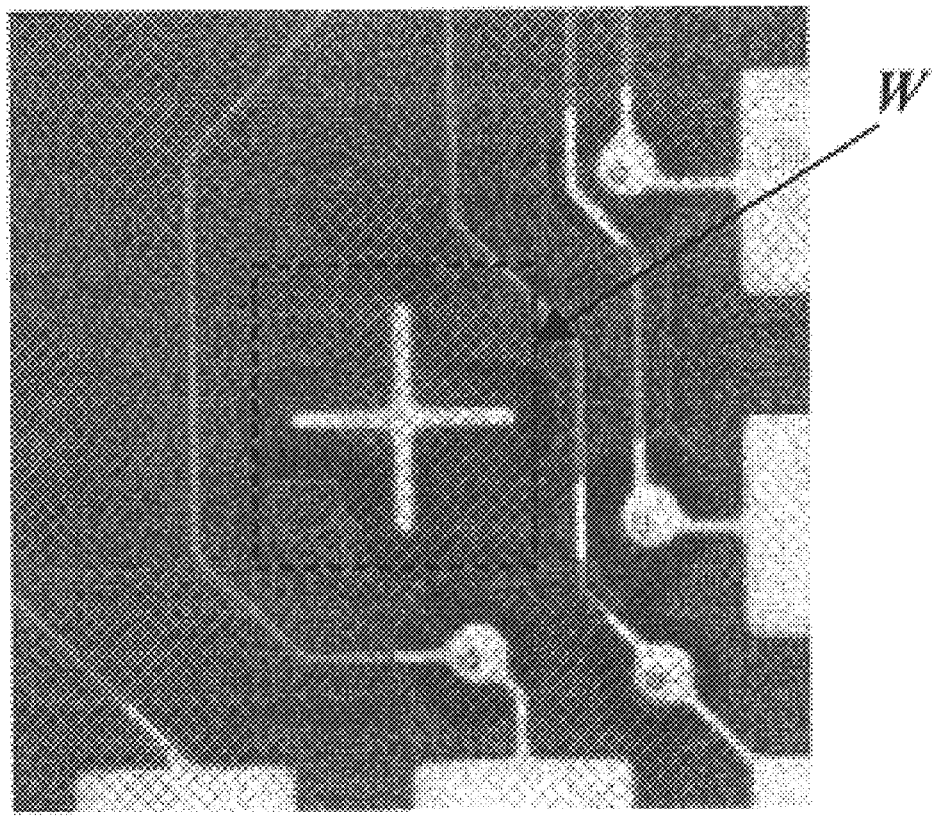
FIG. 2 illustrates an example reference image with a template indicated by the dashed window W.

The following will describe hierarchical nearest-neighbor search system 12. The 2D object localization problem in machine vision for the image reference approach can be posed as follows. Assume the reference image is denoted by $I(x,y)$ and the template object is given inside a window $W=\{(x,y)|x_0 \leq x \leq x_1, y_0 \leq y \leq y_1\}$ of the reference image. FIG. 2 shows an example reference image with the template window W inside for the pick-and-place assembly application. The 2D object localization must find the best match of the template in the input image $F(x,y)$ with a global transformation $T_\theta$, where $T_{74}$ can be the 2D rigid transformation containing a translation and rotation or the affine transformation with the transformation parameters given in the vector $\theta$.

To improve the efficiency of the search system, a best match base on the comparisons between feature vectors computed from the images are found, instead of comparing directly between images. The feature vector matching strategy involves computing representative feature vectors for each image inside the template window and then finding the best match as follows $$\hat{k} = \arg\min_k \sum_{i=1}^{p} (v_i^{(k)} - u_i)^2, \quad (1)$$

where u and $v^{(k)}$ are p-dimensional feature vectors for the input image $F(x,y)$ and transformed reference images $I_k(x,y)$ inside the template window W. The feature vector used in this example contains wavelet features computed from the image. The feature vectors $v^{(k)}$ can be computed and stored in the training phase. In the execution phase, only the computation of the feature vector u and the search of the best match between u and all $v^{(k)}$ is required. The use of the representative feature vector is principally a dimensionality reduction procedure to reduce the storage as well as computation required for the present invention.

Hierarchical nearest-neighbor search system 12 is used to further reduce the search computational complexity. This system is based on a hierarchical competitive layer neural network. It drastically saves the computational cost in the search of a best match with some additional storage requirement for storing the weights in the neural networks. In addition, it requires some training time for the neural networks in the training phase.

Figure 3:
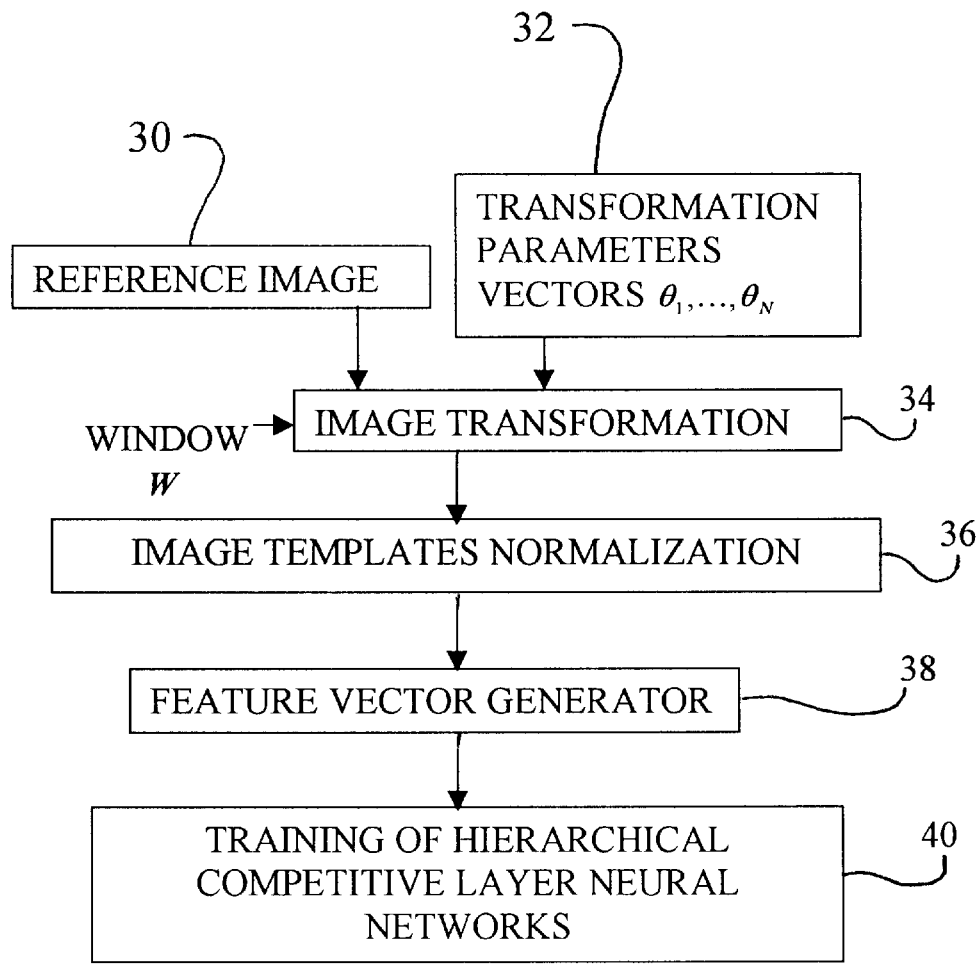
FIG. 3 illustrates a flow diagram of a training phase in the object localization system of the present invention.

There are two phases in the object localization system of the present invention that take place in hierarchical nearest-neighbor search system 12, namely a training phase and an execution phase. The flow diagram for the training phase is shown in FIG. 3. The training phase contains a generation of image templates from reference image 30 under different transformation parameter vectors $\theta_1, K, \theta_N$ 32. Reference image 30 and transformation parameter vectors 32 are inputted to image transformation 34 which also receives an input of window W. The output of image transformation 34 flows to image template normalization 36, which includes the re-sampling the image inside the template window into a fixed size and normalization of the re-sampled image intensity value by subtracting its mean and scaling the mean-subtracted image values to unit variance. The re-sampling of the image in a template window to a fix size is for ease of computation in wavelet transformation, which is required in feature generator 38. The computation of representative feature vectors for all of the normalized image templates is performed by feature vector generator 38. This involves computing the wavelet transformation of the normalized image and using some important wavelet coefficients for the representative feature vector. The representative feature vectors are provided to trainer of hierarchical competitive layer neural networks 40.

Figure 4:
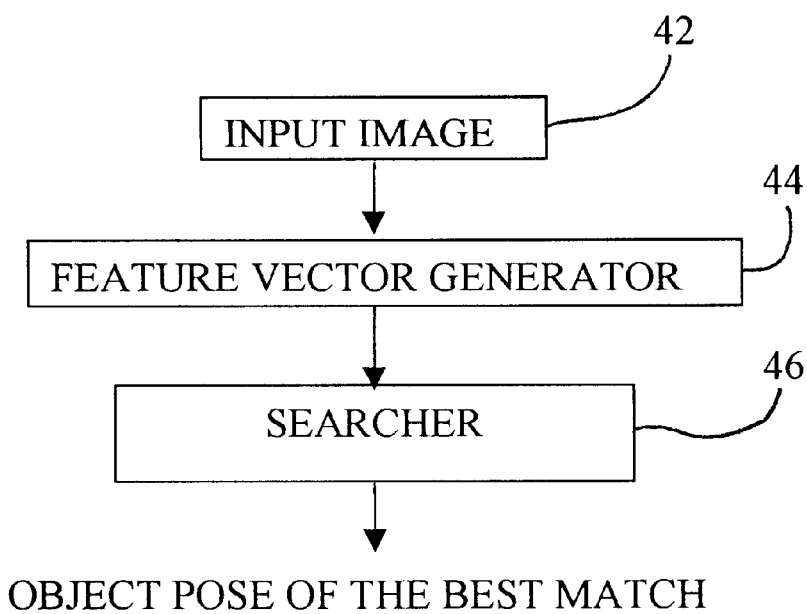
FIG. 4 illustrates a flow diagram of an execution phase in the object localization system of the present invention.

The flow diagram of the execution phase is shown in FIG. 4. The execution phase comprises the feature generation within feature vector generator 44 from input image 42 and the hierarchical nearest-neighbor search within searcher 46 for the transformation parameter vector of the best match. Note that the feature generator 44 consists of re-sampling the input image inside the template window, normalizing the re-sampled image values to zero mean and unit variance, taking wavelet transform of the normalized image and using some important wavelet coefficients to be the feature vector. The output of the execution phase is object pose of the best match.

Figure 5:
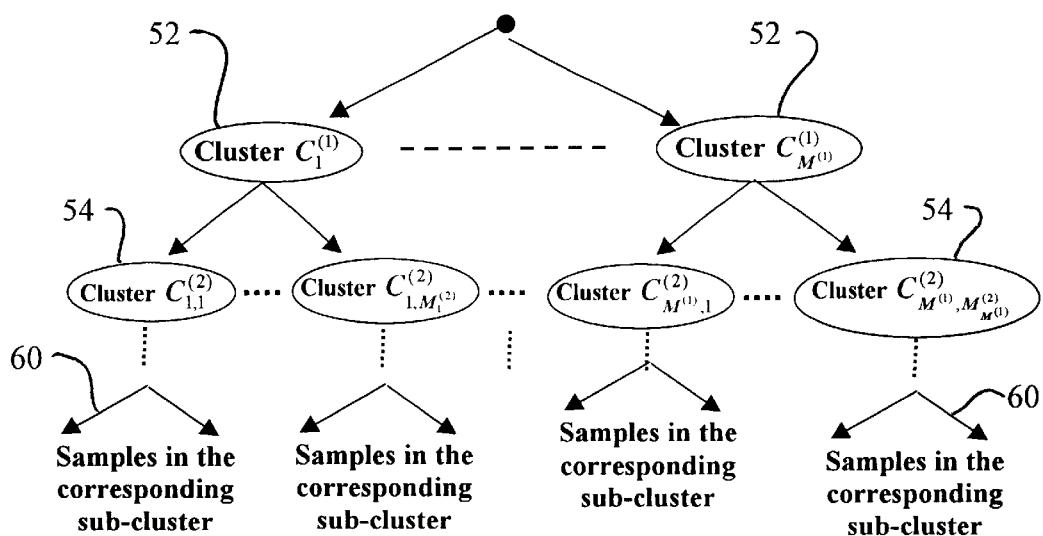
FIG. 5 illustrates hierarchical clustering of data samples in an entire search data set for a fast nearest-neighbor search.

The hierarchical clustering of the entire feature vectors $v_1, K, v_N$ is accomplished by using the hierarchical competitive networks. This is further described by S.-H. Lai and M. Fang in "Adaptive Medical Image Visualization Based On Hierarchical Neural Networks And Intelligent Decision Fusion", Proceedings of IEEE Workshop on Neural Networks for Signal Processing, pp. 438–447, Cambridge, England, 1998. In FIG. 5, the entire feature vector samples are first clustered into $M^{(1)}$ clusters 52, namely cluster $C_1^{(1)}$, K, $C_{M^{(1)}}^{(1)}$. In the second level, each cluster $C_j^{(1)}$ can be further partitioned into $M_j^{(2)}$ sub-clusters, i.e. cluster $C_{j,1}^{(2)}$, K, $C_{j,M_j^{(2)}}^{(2)}$. Note that the superscripts (1) and (2) stand for the indexes of levels in the hierarchical clustering structure. The hierarchical clustering structure can be repeated for many levels. In the last level 60, each sub-cluster contains some corresponding feature vector samples that fall into it.

The training of the competitive networks is an unsupervised learning process. The Kohonen's learning rule was employed in this unsupervised training process. This is further described by T. Kohonen in *Self-Organization and Associative Memory,* 2nd Edition, Springer-Verlag, Berlin, 1987. The training of all the competitive networks is performed in a top-to-down approach, i.e. the training of the competitive networks starts from the first level to the last level. The training results for the current level are propagated into the training of the next level.

The following will describe the optical-flow based energy minimization system, 14 of FIG. 1. This system is an accurate, efficient and robust system for determining precise pattern localization. This system is based on a least squares fitting of the modified optical flow constraints. No feature correspondence is required in this system. However, some points with reliable data constraints are selected for efficient computation in the training phase of the optical-flow based energy minimization system. In addition, this system is robust against noises and uniform illumination changes, since the modified optical flow constraint accounts for the illumination changes. For the present invention, the determination of the 2D rigid with scaling transformation between the input image and pattern image is focused on. Other global transformation models, such as affine transformations, can also be employed in the same framework of the present invention. A rough initial guess for this localization system is supplied by the hierarchical nearest-neighbor search system which is discussed above. The aim of this energy minimization system is to obtain a precise localization of a pattern given a rough initial guess.

2D rigid transformations with size changes are considered and the transformed location (u,v) at the location x,y can be written as $$\begin{pmatrix} u \\ v \end{pmatrix} = \sigma \begin{pmatrix} \cos\theta & -\sin\theta \\ \sin\theta & \cos\theta \end{pmatrix} \begin{pmatrix} x - x_c \\ y - y_c \end{pmatrix} + \begin{pmatrix} x_c + \Delta x \\ y_c + \Delta y \end{pmatrix} \quad (2)$$

where $(\Delta x, \Delta y)$ is the translation vector, $\theta$ is the rotation angle, $\sigma$ is the size scaling factor, and $(x_c, y_c)$ is the center of rotation. Due to the fact that there are an infinite number of possible combinations of the translation vector, rotation angle and rotation center for any 2D rigid transformation, the rotation center is chosen to be the same as the center of the template without loss of generality.

The energy function to be minimized in this system is a sum of squared modified optical flow constraints given as follows $$E(\Delta x, \Delta y, \theta, \sigma, a, b) = \sum_i w_i (I_{x,i}(\Delta x + x_c - x_i) + I_{y,i}(\Delta y + y_c - y_i) + \sigma(f_i \cos\theta + g_i \sin\theta) - f_i + I(x_i, y_i) - aF(x_i, y_i) - b)^2$$

where $w_i$ is the weight associated with the i-th constraint selected at the location $(x_i, y_i)$, $I_{x,i}$ and $I_{y,i}$ are the partial derivatives of the reference image $I(x,y)$ along the x and y directions respectively at the location $(x_i, y_i)$, $f_i = I_{x,i}(x_i - x_c) + I_{y,i}(y_i - y_c)$, $g_i = -I_{x,i}(y_i - y_c) + I_{y,i}(x_i - x_c)$, and a is the multiplication factor and b is the offset factor to model the uniform illumination change. This energy minimization problem is a nonlinear least square minimization problem. When a good initial guess is available, the Newton method can be employed to solve this minimization problem very efficiently. The iterative energy minimization system is used that includes a Newton update in each iteration of the iterative energy minimization framework to obtain the least squared solution very efficiently.

Figure 6A:
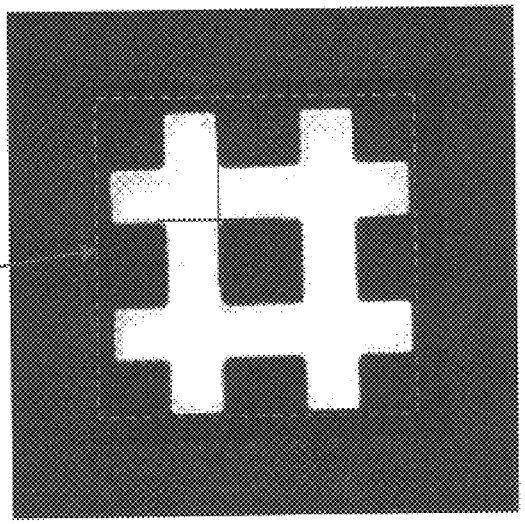
FIG. 6 illustrates in FIG. 6(a) a first reference image and a template window used for experiments on pattern localization under a large search space and in FIG. 6(b) and FIG. 6(c), two input images with located reference points using the FLASH system of the present invention.

The following will describe experimental results utilizing the present invention. Throughout the experiments, two reference images with the template windows as shown in FIGS. 6a and 7a are used. The sizes of both images are 400×400. The feature vector used in the experiments is the concatenation of normalized wavelet features computed the image. After the dimensionality reduction, the size of the feature vector is 256.

The search range in the experiments is set to be within ±50 pixels for both the shifts in $\Delta x$ and $\Delta y$, within ±45 degrees for the rotation angle $\theta$, and within ±20% for the scaling factor $\sigma$. After the discretization in the search space, there are a total number of 25137 samples in the discrete search space, i.e. N=25137. In one implementation of the hierarchical nearest-neighbor search system of the present invention, two levels in the hierarchical competitive networks are used for clustering.

Figure 6B:
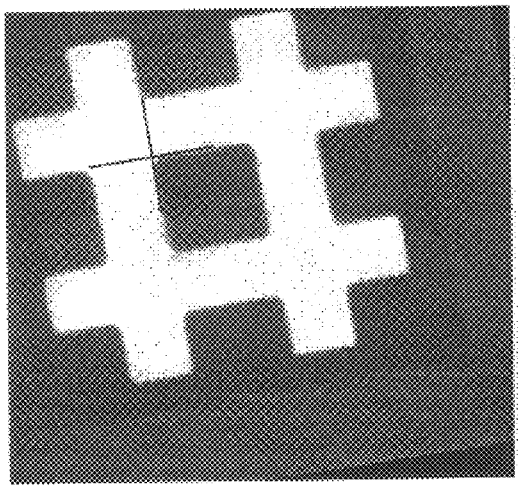
Figure 6C:
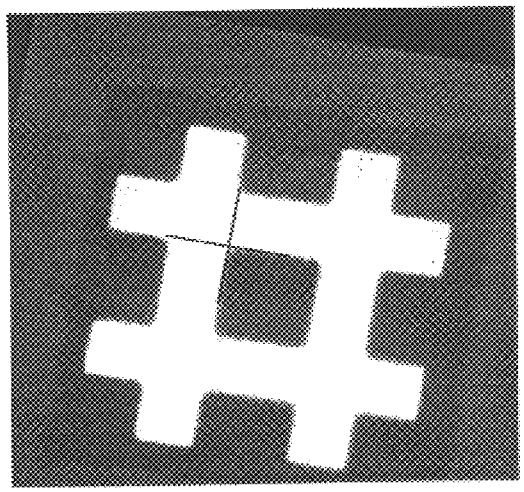

The FLASH system of the present invention provides very accurate localization results. Two examples of pattern localization using the FLASH system are shown in FIGS. 6 and 7. FIG. 6 illustrates in FIG. 6(a) a first reference image with a selected reference point indicated by a cross sign used for experiments on pattern localization and in FIG. 6(b) and FIG. 6(c), two input images with located reference points estimated from the FLASH system. FIG. 7 illustrates in FIG. 7(a) a second reference image with a selected reference point indicated by a cross sign used for experiments on pattern localization and in FIG. 7(b) and FIG. 7(c), two input images with located reference points estimated from the FLASH system of the present invention. In this example, the errors in translation estimates are within 0.08 pixels for $\Delta x$ and $\Delta y$, and the errors in rotation estimates are within 0.05 degrees. The execution time for the FLASH system takes less than 0.05 seconds on a Pentium Pro 200 PC running NT 4.0.

In summary, the present invention provides a FLASH system for fast and accurate object localization in a large search space. The FLASH system comprises a hierarchical nearest-neighbor search system for rough localization and an optical-flow based energy minimization system for precise localization. In the first step of the FLASH system, the hierarchical nearest-neighbor search system is used to obtain a rough localization estimate in an efficient fashion and drastically improves the computational speed of the nearest-neighbor search when the search space is large. The optical-flow based energy minimization system is subsequently applied to provide a very accurate estimate with a good initial guess supplied by the hierarchical nearest-neighbor search system. The efficiency and accuracy of the FLASH system was demonstrated through experiments.

It is not intended that this invention be limited to the hardware or software arrangement, or operational procedures shown disclosed. This invention includes all of the alterations and variations thereto as encompassed within the scope of the claims as follows.

What is claimed is:

1. A method for providing pattern localization, comprising the steps of:

applying a window template to a desired portion of an input image, computing an input feature vector representing the image within the window template;

comparing the input feature vector with a plurality of reference feature vectors to find a best match, each reference feature vector representing a corresponding one of a plurality of spatially-transformed reference image templates associated with a reference image;

estimating spatial transformation parameters of the image within the window template based on the best match; and processing the estimated spatial transformation parameters to obtain a more precise localization of a desired pattern of the input image within the window template.

2. The method of claim wherein the spatial transformation parameters include parameters of one of an affine transformation and a 2D rigid transformation comprising scaling and rotation transformations.

3. The method of claim 1, wherein the step of processing the estimated spatial transformation parameters comprises the step of utilizing an iterative energy minimization process.

4. The method of claim 1, wherein the step of computing the input feature vector comprises the steps of:
resampling the image within the window template;
normalizing the resampled image;
wavelet transforming the normalized image; and
selecting desired waveform coefficients for generating the input feature vector.

5. The method of claim 1, further comprising the steps of:
generating the plurality of reference feature vectors; and
training a hierarchical competitive layer neural network using the plurality of reference feature vectors, wherein the step of comparing is performed using the trained hierarchical competitive layer neural network.

6. The method of claim 5, wherein the step of generating the plurality of reference feature vectors comprises the steps of:
generating a plurality of reference image templates from a reference image;
spatially-transforming each reference image template by applying at least one transformation parameter vector to each reference image template; and
generating a reference feature vector from the image within each spatially-transformed reference image template.

7. The method of claim 6, wherein the step of generating a reference feature vector comprises the steps of:
resampling the image within each of the spatially-transformed reference image templates;
normalizing each resampled image;
wavelet transforming each normalized image; and
selecting desired waveform coefficients from each wavelet transform to generate corresponding reference feature vectors.

8. The method of claim 6, wherein the transformation parameter vectors are selected from a predetermined set.

9. A system for providing pattern localization, comprising: a feature vector generator for computing an input feature vector representing an input image within a window template;
a comparator for selecting a best match between the input feature vector and a reference feature vector from a set of reference features vectors, each reference feature vector in the set representing a corresponding one of a plurality of spatially-transformed reference image templates associated with a reference image;
an estimator adapted to estimate the spatial transformation parameters of the input image based on the best match; and
a processor adapted to process the estimated spatial transformation parameters to obtain a more precise localization of a desired pattern of the input image within the template window.

10. The system of claim 9, wherein the spatial transformation parameters include parameters of one of an affine transformation and a 2D rigid transformation comprising scaling and rotation transformations.

11. The system of claim 9, wherein the processor is adapted to estimate the spatial transformation parameters utilizing an iterative energy minimization process.

12. The system of claim 9, wherein the input feature vector generator comprises:
means for resampling the input image within the window template;
means for normalizing the resampled image;
means for wavelet transforming the normalized image; and
means for selecting desired waveform coefficients to generate the input feature vector.

13. The system of claim 9, further comprising:
a reference feature vector generator adapted to generate a plurality of reference feature vectors; and
a trainer adapted to train a hierarchical competitive layer neural network using the plurality of reference feature vectors, wherein the comparator implements the trained hierarchical competitive layer neural network.

14. The system of claim 13, wherein the reference feature vector generator comprises:
means for generating a plurality of reference image templates from a reference image;
means for spatially-transforming each reference image template by applying at least one transformation parameter vector to each reference image template; and
means for generating a reference feature vector from the image within each spatially-transformed reference image template.

15. The system of claim 14, wherein the means for generating a reference feature vector comprises:
means for resampling the image within each of the spatially-transformed reference image templates;
means for normalizing each resampled image;
means for wavelet transforming each normalized image; and
means for selecting desired waveform coefficients from each wavelet transform to generate corresponding reference feature vectors.

16. The system of claim 14, wherein the transformation parameter vectors are selected from a predetermined set.

17. A program storage device readable by a machine, tangibly embodying a program of instructions executable by the machine to perform method steps for providing pattern localization, the method steps comprising:
applying a window template to a desired portion of an input image;
computing an input feature vector representing the image within the window template;
comparing the input feature vector with a plurality of reference feature vectors to find a best match, each reference feature vector representing a corresponding one of a plurality of spatially-transformed reference image templates associated with a reference image;
estimating spatial transformation parameters of the image within the window template based on the best match; and
processing the estimated spatial transformation parameters to obtain a more precise localization of a desired pattern of the input image within the window template.

* * * * *